Patented July 18, 1933

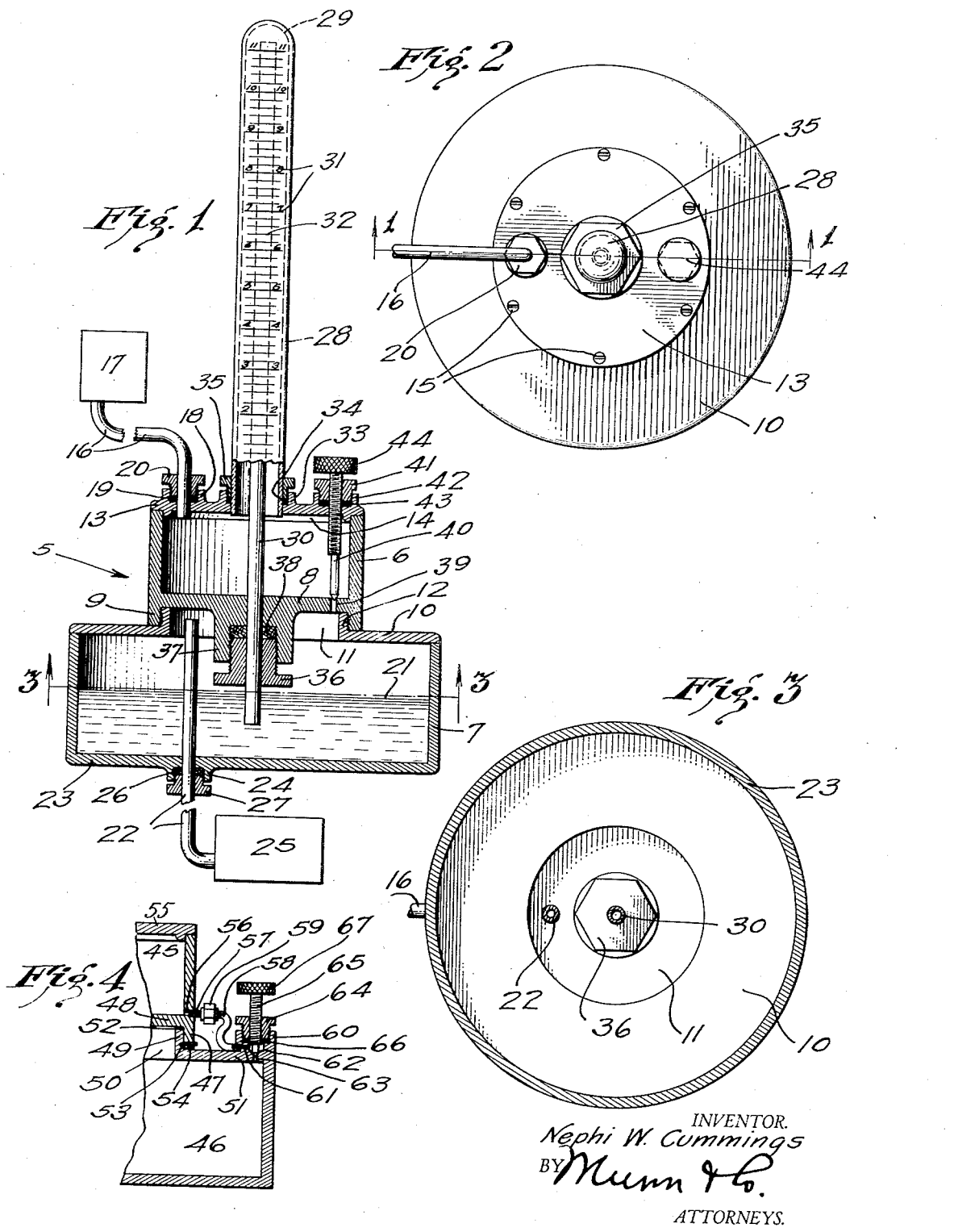

1,918,635

UNITED STATES PATENT OFFICE

NEPHI W. CUMMINGS, OF SAN BERNARDINO, CALIFORNIA

VACUUM OR PRESSURE GAUGE

Application filed May 15, 1929. Serial No. 363,176.

My invention relates to such gauges as are adapted for measuring fluid pressures, and one object of the invention is to construct a gauge of this character so that the gauge can be used both as an apparatus for measuring vacuums and as an appartus for measuring pressures greater than the atmospheric, as well as an apparatus for measuring differentials of such pressures.

Another object of the invention is to construct a gauge of the aforementioned character so that the gauge is strong and durable, that the tubing required therefor is comparatively short, and that the gauge occupies only a small space, thereby adapting the gauge not only for a satisfactory operation whenever such a gauge is required, but particularly adapting the gauge to be installed in motor-driven vehicles and to be operated in conjunction with a suitable apparatus for measuring the supply of liquid fuel, oil or water, in the vehicles.

Another object of the invention is to construct a gauge of the aforementioned character so that the reading scale is close to the tube for indicating vacuum or pressure and that only one reading is required in order to determine a certain vacuum or pressure condition, thereby dispensing with calibration, and thus considerably facilitating the reading of the gauge.

A further object of the invention is to provide a gauge of the aforementioned character with virtually straight tubing, and to provide means for quickly connecting the tubing with, or disconnecting the tubing from, the gauge, so that the cleaning of the tube and the renewal thereof, when required, is thereby facilitated.

A still further object of the invention is to construct the gauge of the aforementioned character, so that, if the gauge should be subjected to an excessive vacuum or pressure condition, the liquid can not be blown out of the gauge, and that the gauge can not be injured thereby, and also to provide the gauge with valve-controlled means in order to restore the gauge to a normal condition, after its subjection to the excessive vacuum or pressure condition, and in order to prevent the liquid from rising excessively in the tube for indicating the vacuum or pressure conditions.

With the aforementioned objects, and with other objects in view, my invention consists in the novel construction and combination of parts hereinafter described, illustrated in the accompanying drawing, and set forth in the appended claims, it being understood that various changes in the form, proportion, size and minor details of construction within the scope of the claims may be made without departing from the spirit, and without sacrificing any of the advantages, of the invention.

In the drawing:

Fig. 1 is a mid-sectional elevation of the gauge of my invention, the view being taken in a plane, indicated by the line 1—1 in Fig. 2, and showing diagrammatically how the gauge may be connected with sources for producing vacuum or pressure conditions;

Fig. 2 is a plan of the gauge, as seen from the top in Fig. 1;

Fig. 3 is a horizontal section of the gauge, taken in a plane indicated by the line 3—3 in Fig. 1; and Fig. 4 is a mid-sectional elevation of a portion of a gauge similar to that shown in Fig. 1, but showing a different arrangement of the valve-controlled communication means between the upper and the lower casing and also showing a different way of securing the upper and the lower casings to each other.

The vacuum or pressure gauge of my invention is indicated in Fig. 1 as a whole by the numeral 5. This gauge comprises two casings, 6 and 7, which are adapted to be connected with each other, so that, when the gauge is in its operative position, one casing is above the other. For the purpose of description, the casing 6 may thus be referred to as the upper casing, and the casing 7 may be referred to as the lower casing.

Both of the casings are shown as cylindrical, and in Fig. 1, the casing 6 is shown as provided with a bottom 8 arranged a litttle distance from the lower end of the cylindrical wall of the casing so that under the bottom is thereby formed an annular flange 9, which in this instance is shown as internally threaded. The lower casing is provided with a top 10, in which is preferably formed a central opening 11, bounded by an upward extending annular flange 12, and this flange is externally threaded and fits within the flange 9, so that thereby the two casings may have a fluid-tight connection with each other.

In order to make the interior of the upper casing accessible and also in order to close the casing so that the casing forms an air chamber, a cover 13 fits on the top of the casing, and has on its inner side an annular flange 14, which snugly fits the interior of the cylindrical wall of the casing, and the cover is secured to the casing by screws 15, which are threaded into the cylindrical wall of the casing so that, when the screws are tightened, the connection between the cover and the casing is fluid-tight.

By a pipe 16, extending through the cover 13, the casing or air chamber 6 may communicate with an apparatus 17, which may be a vacuum-producing source or a source for producing pressures greater than the atmospheric, or the air chamber may communicate through the pipe directly with the atmosphere, according to the purpose for which the gauge 5 is to be used. An internally threaded boss 18 is preferably formed on the outside of the cover around the pipe 16, and a packing 19 is placed in the boss around the pipe, while a gland 20 around the pipe is threaded into the boss and by its pressure on the packing causes the latter to seal the connection between the cover and the pipe, or the connection may be made fluid-tight by any other suitable means.

The casing 7 is adapted to form a reservoir for liquids, indicated at 21, and a pipe 22 extends from the reservoir, preferably through the bottom 23 thereof and through a boss 24 on the underside of the bottom, from a point above the level of the liquid in the reservoir so as to prevent the escape of liquid through the pipe. This pipe may lead from the reservoir to an apparatus 25 of any suitable construction adapted to serve as a source for producing pressures greater than the atmospheric, or the pipe may lead from the reservoir directly to the atmosphere. In either case, the arrangement of the pipe 22 is according to the arrangement of the pipe 16, so that the pipes will co-operate in order to effect a proper functioning of the gauge 5.

Like the pipe 16, the pipe 22 has around it suitable packing means in order to prevent leakage of liquid from the reservoir 7 around the pipe. In the present instance, such means is shown as a packing 26 around the pipe within the boss 24, the latter being counterbored for this purpose and being internally threaded for receiving therein an externally threaded gland 27, which surrounds the pipe 22, and by its compression of the packing 26, makes the connection of the pipe with the reservoir fluid-tight.

The cover 13 has therein an opening, preferably in its center, for the purpose of receiving therein the lower, open end portion of a tube 28, which is made of glass or some other suitable transparent material, and extends upward a suitable distance, the tube being closed at its upper end, as shown at 29. Another tube 30, comparatively small in diameter, and, similarly to the tube 28, made of a suitable transparent material, extends within the tube 28 from a point near the end 29 to a point below the level of the liquid 21 in the reservoir 7, so that, under certain vacuum or pressure conditions, the liquid is caused to rise in the tube 30 in order to indicate such conditions. The tube 28 is provided with indicia 31, which are arranged so as to form a suitable scale 32 back of, and close to, the tube 30, thus, by the proximity of the scale to the liquid column in the tube 30, facilitating the reading of the vacuum or pressure condition indicated by the liquid column.

Any suitable means for making the respective connections of the tubes 28 and 30 with the cover 13 and the bottom 8 fluid-tight may be provided. For this purpose, the cover may thus have on its upper or outer side formed centrally thereon a counterbored boss 33, with a packing 34 therein surrounding the tube 28, and with a gland 35 screwed into the boss so as to compress the packing, while a gland 36 is screwed into a boss 37, formed centrally on the underside of the bottom 8, and compresses a packing 38, which surrounds the tube 30 within the boss 37.

Although not absolutely necessary, it is desirable to provide a passage by which the air chamber or upper casing 6 is in communication with the liquid reservoir or lower casing 7. Such a passage is shown at 39 in Fig. 1 it being formed in the bottom 8 of the upper casing, and a needle-valve stem 40 is shown as extending freely through the cover so as to be adapted to close the passage with its inner end, the valve stem being threaded through a gland 41 which is externally threaded into a counterbored boss 42 on the upper side of the cover 13, and is adapted to compress a packing 43 around the valve stem within the boss and thereby to make the connection of the valve stem with the casing 6 fluid-tight. A knurled head 44 may be formed on the outer end of the needle-valve stem 40 in order to facilitate the turning of the valve stem from the outside of the casings 6 and 7.

It being assumed that the apparatus 17 is a suitable apparatus for producing vacuum conditions and that the gauge 5, constructed as shown in Figs. 1, 2 and 3, is to be used in conjunction therewith for the purpose of indicating the vacuum conditions, the gauge is connected with the apparatus by the pipe 16, as before described. In this instance, the pipe 22 is led directly to the atmosphere. Thus, when the apparatus 17 is operated, a vacuum will be produced in the air chamber 6 so that the atmospheric pressure will force air through the pipe 22 into the reservoir 7 and above the level of the liquid 21 therein, thereby causing the liquid to rise in the tube 30 to a certain level relative to the indicia 31 of the scale 32 and consequently enabling a person to read directly from the scale the correct vacuum condition produced by the apparatus 17.

Again, if it is assumed that the gauge 5 is to be used in conjunction with a suitable apparatus 25 for producing pressures greater than the atmospheric, the gauge is connected with the apparatus by the pipe 22, while the pipe 16 is led from the gauge directly to the atmosphere. During the operation of the apparatus 25, the resulting pressure condition will thus force the fluid from the apparatus through the pipe 22 into the reservoir 7 against the atmospheric pressure in the air chamber 6, thereby also in this instance causing the liquid in the reservoir to rise in the tube 30 to a certain level relative to the indicia of the scale 32, so that a correct reading of the pressure condition produced by the apparatus is obtainable directly from the scale.

Sometimes it is desirable to use the gauge 5 for indicating differentials of pressures. In such a case, both of the apparatuses 17 and 25 are adapted to produce certain pressure conditions, the apparatus 17 being suitable for producing a lower pressure condition than the apparatus 25, and being connected with the air chamber 6 by the pipe 16, while the apparatus 25 is connected with the liquid reservoir 7 by the pipe 22. When the pressures produced by the two apparatuses are balanced, the liquid 21 in the reservoir is at its normal level, but as soon as the pressure condition produced by the apparatus 25 is greater than the pressure condition produced by the apparatus 17, the liquid is caused to rise in the tube 30, thus making it possible to read directly the differentials between the pressures simply by noting the levels of the liquid in the tube 30 relative to the indicia 31 of the scale 32.

If, during the use of the gauge 5 for its various purposes, as described, it should happen that the gauge is subjected to an extreme vacuum condition from the apparatus 17 or to an extreme pressure condition from the apparatus 25, the liquid 21 in the reservoir 7 will not be blown out of the gauge, but some of the liquid will merely be caused to flow over the top of the tube 30 and to descend by gravity through the tube 28 into the air chamber 6, where it is trapped. By slightly turning the valve stem 40 so as to effect communication between the air chamber and the reservoir through the passage 39, the entrapped liquid will then be caused by its gravity to flow back into the reservoir through the passage, which thereafter again is closed by the valve stem so as to return the gauge to its normal condition for reading.

When the gauge is initially operated, the valve 40 may be slightly opened, the passage 39 then serving as a convenient by-pass for fluids in order to prevent the excessive rising of liquid in the tube 30. Of course, as soon as any tendency to such an excessive rising of the liquid in the tube has been overcome, the valve is closed in order to effect a correct functioning of the gauge.

In Fig. 4 are shown fragmentally the upper and the lower casings of a gauge in which the parts not shown are preferably constructed and arranged in the same manner as the corresponding parts of the gauge 5 shown in Figs. 1, 2 and 3. The upper casing or air chamber 45, however, is shown as being secured to the lower casing or liquid reservoir 46 in a somewhat different manner from that in which the air chamber 6 in the gauge 5 is secured to the liquid reservoir 7, and the arrangement of the valve-controlled means for providing communication between the air chamber and the liquid reservoir is also different. The upper casing 45, like the casing 6, has an annular flange 47 formed below its bottom 48, and, like the casing 7, the lower casing 46 is provided with an annular flange 49 which bounds an opening 50 in the top 51 of the casing and fits snugly within the flange 47, but is not in a threaded engagement therewith, as the flange 12 is with the flange 9. An annular gasket 52 of a suitable material may be inserted between the flange 49 and the bottom 48, and the flange 49 has formed in its periphery a groove 53 adapted to be engaged by the inner ends of a number of set-screws 54, which are threaded through the flange 47, so that, when the set-screws are tightened, the flange 49 forces the gasket against the bottom 48 with a pressure sufficient for making the connection between the casings 45 and 46 fluid-tight.

The cover 55 for the upper casing of the gauge shown in Fig. 4 is similar to the cover 13 for the casing 6, except that it is not provided with means for receiving a valve stem therein, and that the bottom 48 is without a passage whereby the upper casing is in communication with the lower casing.

Adjacent to the bottom 48, the upper casing or air chamber 45 has, instead of a passage through the bottom, an opening 56 in its side wall, and a suitable nipple 57, secured in the side wall of the air chamber and leading from the opening 56, is connected with one end of the pipe 58 by a coupling 59. The other end of the pipe 58 is secured to a centrally bored boss 60 on the top 51 so that the pipe communicates with an opening 61, which is formed in the side of the boss and leads to a reduced portion 62 of the central bore in the boss. In its turn, this reduced bore portion 62 communicates with an opening 63, formed in the top 51 co-axially with the central bore in the boss. The opening 56, the nipple 57, the pipe 58, the opening 61, the bore portion 62, and the opening 63, thus together constitute a passage whereby the air chamber 45 communicates with the liquid reservoir 46.

Above its reduced portion 62 the central bore in the boss 60 is threaded and has screwed therein a centrally bored and threaded gland 64, and a needle-valve stem 65, screwed into the gland, is adapted to close the opening 63 with its inner end. A packing 66 is placed in the bottom of the central bore in the boss 60 above the reduced portion 62 and surrounds a portion of the valve stem 65, so that, when the packing is compressed by the gland, the connection of the valve stem with the casing 46 is fluid-tight. In order to facilitate the turning of the valve stem, the latter may be provided at its outer end with a knurled head 67.

It is clear from the foregoing that the needle-valve stem 65 serves as a means for closing the passage, comprising the opening 56, the nipple 57, the pipe 58, the opening 61, the bore portion 62, and the opening 63, between the air chamber 45 and the liquid reservoir 46 in a manner similar to that in which the passage 39 between the air chamber 6 and the liquid reservoir 7 in the gauge 5 is closed by the needle-valve stem 40. The operation of the gauge shown in Fig. 4 is therefore identical with the operation of the gauge 5, and the use of the gauge as a means for enabling a person to read directly certain vacuum or pressure conditions is therefore understood from the description in regard to the gauge 5, so that a further description is deemed superfluous.

If so desired, when a gauge of my invention is used for indicating vacuum or pressure conditions in connection with motor-driven vehicles, the gauge may be constructed without the valve-controlled passage between the air chamber and the liquid reservoir.

A particularly important advantage of the gauges shown and described is that the gauges are of a simple and durable construction and can not easily get out of order. The gauges of my construction are therefore adapted for use in places where the use of similar gauges heretofore known in the art is impracticable.

I claim as my invention:

1. A fluid pressure gauge, comprising two casings one above the other, the lower casing forming a reservoir and containing a liquid therein, and the upper casing forming a chamber; means for connecting the chamber with a source of fluid under pressure; means for connecting the reservoir to a source of fluid under a pressure greater than the first mentioned pressure; a transparent tube extending upward from the chamber and being closed at its upper end; and a second transparent tube extending from a point within the first mentioned tube to a point below the liquid level in the reservoir.

2. A fluid pressure gauge, comprising a pair of casings disposed one above the other, the lower casing forming a reservoir and containing liquid, the upper casing forming a chamber, and said casings having a passage to provide communication between the reservoir and the chamber; a valve for controlling the flow of liquid through said passage; means for connecting the reservoir to a source of fluid under pressure; means for connecting the chamber with a source of fluid under a pressure less than the first mentioned pressure; a transparent tube extending upward from the chamber and closed at its upper end; and a second transparent tube extending from a point within the first mentioned tube to a point below the liquid level in the reservoir.

3. A fluid pressure gauge, comprising a reservoir adapted to contain a liquid, means for connecting the reservoir to a source of fluid under pressure, a chamber adjacent the reservoir, a vertical tube having its lower end below the surface of liquid in the reservoir so that liquid can rise in the tube when the pressure in the reservoir becomes greater than the pressure in the tube, means for connecting the upper end of said tube to the chamber, and means for connecting the chamber to a source of fluid under a pressure less than the first mentioned pressure whereby the level of liquid in the tube will indicate the difference in pressure between the two sources, said tube having at least a portion thereof transparent so that liquid in the tube can be viewed for measuring.

4. A gauge for determining the difference in fluid pressure between two sources, comprising: a liquid containing reservoir adapted for connection to a source of fluid under pressure; a chamber adapted for connection to a second source of fluid under pressure; an open-ended vertically disposed transparent tube having its lower end below the surface of liquid in the reservoir; and a second transparent tube receiving the upper portion of the first tube, the second tube being closed at its upper end and communicating at its lower end with the chamber for the delivery to the latter of liquid expelled from the first tube.

NEPHI W. CUMMINGS.